United States Patent Office 2,929,718
Patented Mar. 22, 1960

2,929,718

PROCESS OF MAKING APPLE CHIPS OUT OF APPLES

Stephen J. Mattis, Hasbrouck Heights, N.J.

No Drawing. Application October 1, 1957
Serial No. 687,351

1 Claim. (Cl. 99—100)

This invention relates to a process for slicing apples into what is termed chips which are then blended or combined with some suitable food material, such as, and preferably, cornstarch. I have found after many experiments it produces very edible apple chips. It is therefore the principal object of my invention to produce apple chips which will withstand considerable handling without breaking up, and chips which have a very satisfactory taste.

In order to obtain the principal object of the invention, I have found by many experiments that slicing the apples up with the skin or peeling thereon, with the chips having a thickness of approximately .056 inch, the slicing is carried as closely as possible to the core, but eliminating the same. It is also found that the core or any apple meat attached thereto can be used for other purposes which are not a part of my present invention. I have found by numerous experiments that a much better product can be obtained by using the peeling on the apple so it holds the chips and greatly helps to prevent the chips from breaking during the different steps in the operation of applying the cornstarch or other suitable material to the chips.

After the apple has been transformed into chips, these are then placed on a member having a suitable surface such that the chips will not stick thereto. I have found that tinfoil is very useful for this purpose, the tinfoil being carried on a flat base of suitable material which will withstand the treating operations that follow. After the chips have been placed on the carrier member just described, this member with the chips thereon, is subjected to a low steam pressure for a time sufficient to soften the chips. Then the cornstarch or other edible material is applied to the chips by dusting or spraying. Then, in due course, the chips are turned over and the opposite side is subjected to the same treatment. After the chips have been through this principal treatment by which the cornstarch or other edible material is applied to both sides of the chips, they are then passed into a preheated baking oven for approximately ten minutes at a temperature of 250 degrees F., depending on the kind of apples being treated and the thickness of the chips. After this first ten minutes of baking the chips are turned over, then baked for another period of time of approximately twenty minutes, depending on the character of the chips, which will complete the process.

It will be understood that the time and temperature required for the treating steps will depend to some extent on the type of apples being treated, as some types of apples are much harder than others, so I do not wish to be limited to the time and temperature mentioned, but when the foregoing process is carried out, it will produce apple chips of a first-class quality.

Having thus described my invention, what I claim is:

The process of making apple chips which consists in slicing the apples with the skins thereon to about .056 of an inch, then placing the slices on a material to which they will not stick and passing them through a steam bath so both sides of the slices will be softened and then dusting both sides of the softened slices with cornstarch, then baking the dusted slices in an oven for approximately ten minutes at a temperature of about 250 degrees F., depending on the kind of apples being treated, and after the first ten minutes of baking, turning the slices over and baking for another period of time of about twenty minutes to complete the process of producing the chips.

References Cited in the file of this patent

The Gourmet Cookbook, Gourmet, 1950, p. 492.
The New Settlement Cook Book, Simon and Schuster, New York, 1954, pp. 272, 352.